(12) United States Patent
Goeppert et al.

(10) Patent No.: US 10,161,497 B2
(45) Date of Patent: Dec. 25, 2018

(54) METHOD FOR AVOIDING OR REDUCING CHATTER VIBRATIONS

(71) Applicant: SCHAEFFLER TECHNOLOGIES AG & CO. KG, Herzogenaurach (DE)

(72) Inventors: Georg Goeppert, Hausach (DE); Loyal George MacMillian, Karlsruhe (DE)

(73) Assignee: Schaefler Technologies AG & Co. KG, Herzogenaurach (DE)

( * ) Notice: Subject to any disclaimer, the term of this patent is extended or adjusted under 35 U.S.C. 154(b) by 371 days.

(21) Appl. No.: 14/400,450

(22) PCT Filed: Jun. 17, 2013

(86) PCT No.: PCT/EP2013/062471
§ 371 (c)(1),
(2) Date: Nov. 11, 2014

(87) PCT Pub. No.: WO2013/189867
PCT Pub. Date: Dec. 27, 2013

(65) Prior Publication Data
US 2015/0134211 A1 May 14, 2015

(30) Foreign Application Priority Data
Jun. 22, 2012 (DE) .................. 10 2012 210 580

(51) Int. Cl.
*F16H 57/00* (2012.01)
*F16H 61/688* (2006.01)

(52) U.S. Cl.
CPC ....... *F16H 57/0006* (2013.01); *F16H 61/688* (2013.01); *F16H 2057/0012* (2013.01)

(58) Field of Classification Search
CPC ............... F16H 57/0006; F16H 61/688; F16H 2057/0012
See application file for complete search history.

(56) References Cited

U.S. PATENT DOCUMENTS 9,243,688 B2 * 1/2016 Reuschel ............ F16H 57/0006

FOREIGN PATENT DOCUMENTS

| DE | 102006008207 A1 | 9/2006 |
| DE | 102006010934 A1 | 9/2006 |
| DE | 102008032757 A1 | 1/2010 |
| DE | 102012209755 | 1/2013 |
| EP | 2067681 | 6/2009 |
| EP | 2083198 A2 | 7/2009 |
| WO | 2012019586 | 2/2012 |
| WO | 2013000449 | 1/2013 |

* cited by examiner

*Primary Examiner* — Edwin A Young
(74) *Attorney, Agent, or Firm* — Brooks Kushman P.C.

(57) ABSTRACT

The present invention relates to a method for avoiding or reducing chatter vibrations in a drivetrain of a motor vehicle having an automated transmission with which two transmission stages are engageable simultaneously, wherein in particular when driving in a first transmission stage a different transmission stage is specifically engaged, synchronized and/or disengaged, in order to deliberately select the natural frequency of the drive train as a function of the operating point in order to reduce or avoid chatter vibrations.

11 Claims, 2 Drawing Sheets

METHOD FOR AVOIDING OR REDUCING CHATTER VIBRATIONS

CROSS-REFERENCE TO RELATED APPLICATIONS

The present application is the U.S. national stage application pursuant to 35 U.S.C. § 371 of International Application No. PCT/EP2013/062471, filed on Jun. 17, 2013, which application claims priority from German Patent Application No. DE 10 2012 210 580.8, filed on Jun. 22, 2012, which applications are incorporated herein by reference in their entireties.

TECHNICAL FIELD

The present invention relates generally to a method for avoiding or reducing chatter vibrations, and, more specifically, for avoiding or reducing chatter vibrations in the drivetrain of a motor vehicle. The present invention also relates to a related device for carrying out a corresponding method.

BACKGROUND

A drivetrain of a motor vehicle is an oscillatory system which has a natural frequency in the absence of an external force. The process of driving a motor vehicle requires the drivetrain to operate over an array of varying frequencies, and an appropriate force is applied to the drivetrain. Some of these operating frequencies inevitably superpose with the natural frequency of the drivetrain and a resonance state is created.

Typically, chatter vibrations within the drivetrain occur due to torsional vibrations in the transmission. Chatter vibrations are especially problematic when the torsional vibrations occur during a resonance state.

Strategies to reduce chatter vibrations in various operating conditions of the motor vehicle are known. For example, it has become known through EP 2067681 B1 that monitoring the occurring vibrations can take place while the motor vehicle is in the process of creeping, and a correction of the maximum torque for creeping is performed.

A method is known in which an adjustment of the clutch is made in the creeping process, resulting in a specified slip change rate. As a result, the range of frequencies that create resonance is intentionally applied to the drivetrain during creeping, and the chatter vibration can at least be reduced by the adjustment of the clutch.

These methods have the disadvantage, however, that the range of the resonant frequency must nevertheless be applied to the drivetrain, so that an occurrence of chatter vibration cannot be avoided reliably in every operating situation.

SUMMARY

According to aspects illustrated herein, there is provided a method for avoiding or reducing chatter vibrations in a drivetrain of a motor vehicle having an automated transmission with which two transmission stages are engageable simultaneously, the method comprising the steps of driving in a first transmission stage, creating a disturbance by a different transmission stage being engaged, synchronized and/or disengaged, and, selecting a natural frequency of the drivetrain using the disturbance, the natural frequency being a function of an operating point.

According to aspects illustrated herein, there is provided a device for carrying out a method for avoiding or reducing chatter vibrations in a drivetrain of a motor vehicle, the motor vehicle having an automated transmission, wherein the transmission has two groups of transmission stages, and one transmission stage from each group is engageable simultaneously, the transmission being operable with automation.

An object of the present invention to create a method and a device, by means of which chatter vibrations can be reduced or avoided, in particular when driving.

This can occur because of the fact that the transmission has a different natural frequency if, when a first transmission stage is engaged, a different second transmission stage is or is not engaged. Thus a change of the state of the second transmission stage from engaged to non-engaged can result in a change of the natural frequency, for example from around 6 Hz to around 8 Hz, which results in a change of the corresponding speed of rotation from around 360 rpm to around 480 rpm.

In an example embodiment, the natural frequency in a transmission setting is lower when another transmission stage is engaged than when another transmission stage is not engaged. This allows the change according to the present invention during the driving process, so that with a second transmission stage engaged it is possible to drive until the corresponding rotational speed of the natural frequency of the non-engaged state has been passed and the transmission stage is subsequently disengaged, and the natural frequency increases as a result, where the corresponding natural frequency has after all already been passed.

In an example embodiment, the other transmission stage is engaged until the rotational speed of the drivetrain corresponding to the natural frequency has been passed without another transmission stage engaged, so that when disengaging the other transmission stage the natural frequency takes on a value which is greater than the natural frequency corresponding to the present speed of rotation. The natural frequency of the currently existing state is not passed through as a result, so that the increase in resonance cannot occur, or not so pronouncedly, when the natural frequency is reached.

In an example embodiment, a synchronization occurs between the transmission stages in such a way that the transmission input shaft, which is connected to the other transmission stage, is accelerated. This makes it possible to achieve the result that the state of the overall device is briefly detuned with the transmission in such a way that an undisturbed and distinct manifestation of resonance cannot occur.

In an example embodiment, the other transmission stage is not engaged when driving, and prior to reaching the rotational speed corresponding to the natural frequency, a synchronization of the other transmission stage occurs.

In an example embodiment, the first transmission stage is not the same as the second transmission stage for driving. The result is that both transmission stages can be engaged simultaneously, for example in a transmission designed as a dual-clutch transmission. However, this simultaneous engagement does not mean that a drive torque is also conveyed via both transmission stages.

In an example embodiment, the first transmission stage for driving is the first gear, while the corresponding second transmission stage is the second gear or a higher gear. When driving in first gear as a transmission stage, a natural frequency in the range of around 6 to 8 Hz can be achieved, which can be varied by engaging or disengaging the second gear as the second transmission stage.

In an example embodiment, the first transmission stage for driving is the second gear, while the corresponding second transmission stage is the first gear or the third gear or a higher gear. This is an advantageous selection, for example for a driving process in winter operation.

In an example embodiment, the transmission is a dual-clutch transmission having two groups of transmission stages, where one clutch is assigned to each group of transmission stages.

These and other objects, advantages and features of the present invention will be better appreciated by those having ordinary skill in the art in view of the following detailed description of the invention in view of the drawings.

BRIEF DESCRIPTION OF THE DRAWINGS

The present invention will be explained in greater detail below on the basis of preferred exemplary embodiments in connection with the associated figures.

The figures show the following.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the invention.

As is used in the present disclosure, sensitivity is depicted as the amplitude of a torque excitation of the first transmission input shaft of the transmission, divided by the torque excitation as a function of the frequency, f.

Figure 1:
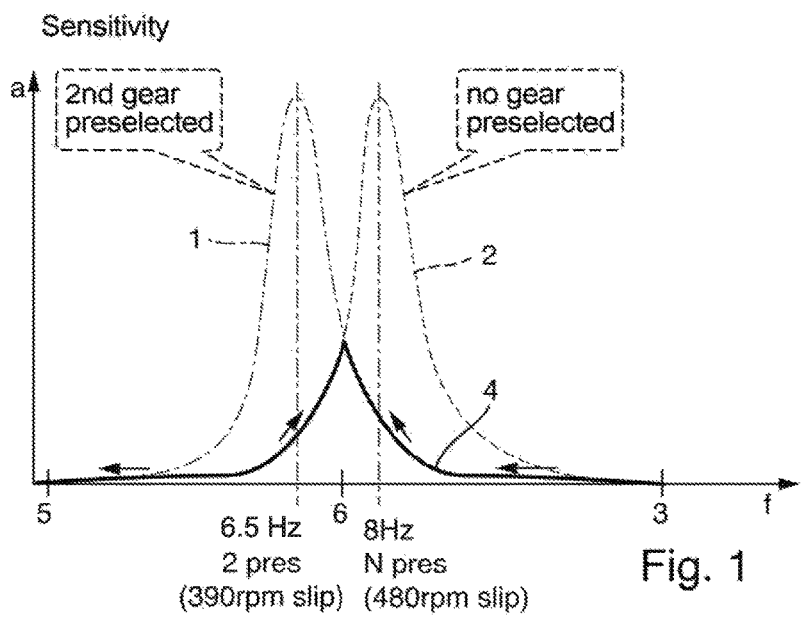
FIG. 1 is a schematic depiction of a diagram explaining an exemplary embodiment of a method according to the present invention.

FIG. 1 shows a diagram depicting a method for avoiding or reducing chatter vibrations in a drivetrain of a motor vehicle having an automated transmission. In FIG. 1, two resonance curves 1, 2 can be recognized; resonance curve 1 has its natural frequency at 6.5 Hz and resonance curve 2 has its natural frequency at 8 Hz. Resonance curve 1 (at 6.5 Hz) corresponds to the natural frequency of the drivetrain when driving in first gear, while the second gear is also engaged in the transmission. Curve 2 (having the resonant frequency at 8 Hz) corresponds to the natural frequency of the drivetrain when driving in first gear, while no other gear is engaged, and the neutral position is selected. The frequencies of 6.5 Hz and 8 Hz correspond to a speed of 390 revolutions per minute (rpm) or 480 revolutions per minute (rpm), respectively, between the transmission input shaft and the engine speed.

Curve 4 depicts the process of engaging the clutch when the vehicle is standing still with the engine running This process begins approximately at point 3 on the x axis, because the slip is essentially equal to the engine speed. As the clutch is progressively engaged, the slip is reduced. This means that curve 4 is traversed from point 3 to point 5 on the x axis when the motor vehicle is in the process of driving with the clutch increasingly engaged.

Still referring to FIG. 1, curve 4 runs from point 3 beyond the 8-Hz boundary along curve 1. The dual-clutch transmission, therefore, allows driving in a first gear while an additional gear is engaged because curve 1 corresponds to the natural frequency of the drivetrain when driving in first gear while the second gear is also engaged. In the exemplary embodiment shown in FIG. 1, the additional gear is the second gear.

Starting from point 6, i.e., after the operating frequency has applied the natural frequency of the drivetrain without a gear engaged at 8 Hz and before the natural frequency has been reached with second gear engaged at 6.5 Hz, the second gear is disengaged in the transmission so that, as the clutch is further engaged and the slip speed is further reduced, curve 4 runs along curve 2 below point 6 and up to point 5.

In an example embodiment, a shifting of the other transmission stage, e.g., an engaged second gear or no second gear, is selected for a driving-off process in first gear in order to deliberately select the natural frequency of the drivetrain and in order to avoid the formation of a resonance rise, at least insofar as possible.

Figure 2:
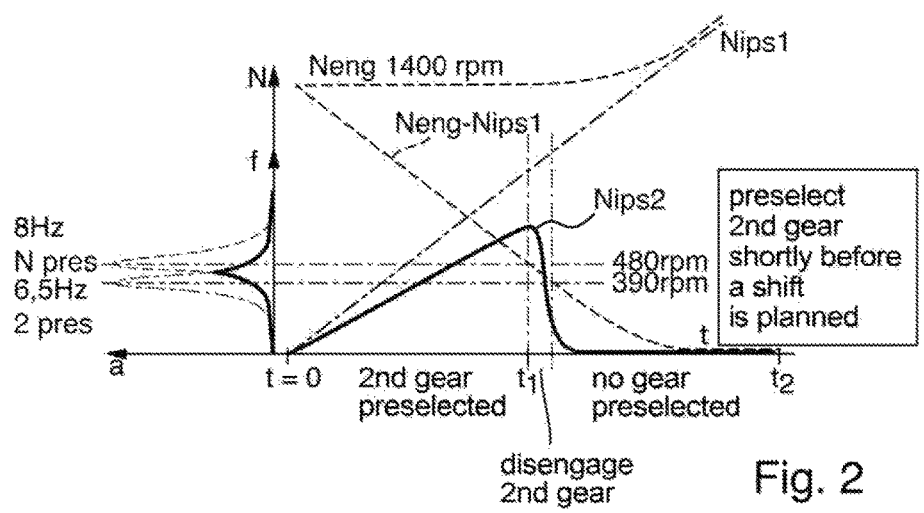
FIG. 2 is a schematic depiction of a diagram explaining the exemplary embodiment of FIG. 1.

FIG. 2 shows in another diagram an example embodiment of a procedure for avoiding or reducing chatter vibrations. In the right-hand sub-diagram, the speeds of rotation are plotted as a function of the time t, while in the left-hand sub-diagram, the depiction according to FIG. 1 is plotted, but is turned on its side.

At t=0 the engagement process begins. The engine speed Neng is 1400 revolutions per minute, and transmission input shaft speed Nips1 of the first transmission input shaft is zero. At the same time, transmission input shaft speed Nips2 of the second transmission input shaft is zero. Since starting from t=0 the clutch is successively engaged for the first gear, both transmission input shaft speed Nips1 and transmission input shaft speed Nips2 increases. The slip, i.e., the difference Neng-Nips1, decreases essentially linearly. As can be seen, the driving-off process with second gear engaged is carried out when driving in first gear. Starting from time t1, the second gear is then disengaged, so that until time t2 no other additional gear in the transmission is engaged. Starting from t1, transmission input shaft speed Nips2 decreases to zero, transmission input shaft speed Nips1 continues to rise linearly and, as can be seen, a change from curve 1 according to FIG. 1 to curve 2 according to FIG. 1 takes place in the left-hand sub-image of FIG. 2.

Figure 3:
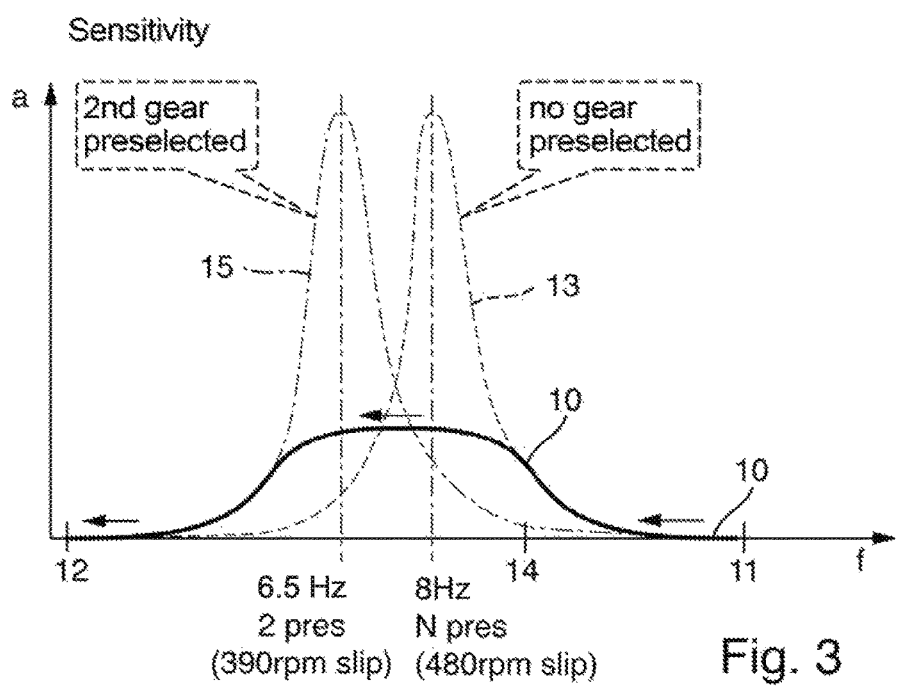
FIG. 3 is a schematic depiction of a diagram explaining an exemplary embodiment of a method according to the present invention; and, FIG. 4 is a schematic depiction of a diagram explaining the exemplary embodiment of FIG. 3.

FIG. 3 shows another exemplary embodiment of the procedure according to the present invention, where the depiction of FIG. 3 corresponds essentially to the depiction of FIG. 1.

The amplitude of the torque excitation of transmission input shaft 1 is again depicted as a function of the frequency f. As can be seen, curve 10 begins at value 11 and runs from higher frequencies to lower frequencies up to point 12. At the beginning, curve 10 follows curve 13, which corresponds to the curve for the resonant frequency or natural frequency at 8 Hz, while, starting from point 14, a disturbance is produced by engaging the second gear and synchronizing that second gear so that a change takes place from the setting of the other transmission ratio from the state "no gear ratio selected" to curve 15, at which the second gear is engaged. Accordingly, starting from point 14, curve 10 no longer follows curve 13, but changes to curve 15 to the falling branch. Between the rising branch of group 13 and the falling branch of group 15, a disturbance takes place in the development of the resonant frequency resulting in a suppression of the resonant frequency.

Figure 4:
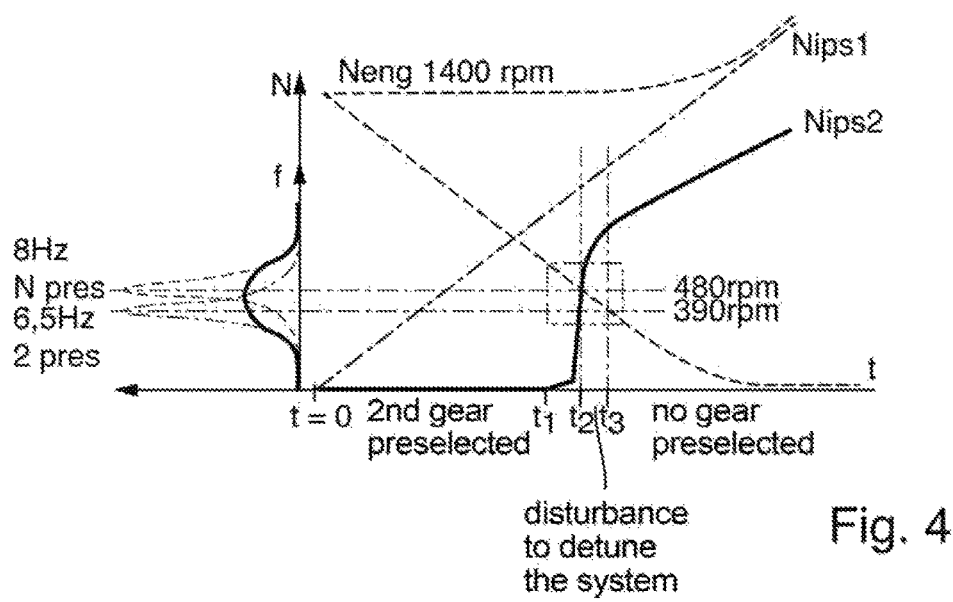

FIG. 4 shows the pattern of the rotational speeds N as a function of the time t for this exemplary embodiment. Transmission input shaft speed Nips1, as well as transmission input shaft speed Nips2 are constant at t=0, and the engine speed Neng is constant at about 1400 revolutions per minute. At t=0 the engagement process of the dual-clutch transmission now begins for driving in first gear. The other transmission stage is not engaged, so that transmission input shaft speed Nips2 remains at 0 while transmission shaft speed Nips1 increases linearly. Starting at time t1, a disturbance of the drivetrain occurs in that the second gear is engaged or synchronized in order to achieve a detuning of the system. From t1 until around t3, transmission input shaft speed Nips2 increases by steps and proceeds essentially linearly from t3 onwards. In this window of the stepped increase of transmission input shaft speed Nips2, the disturbance of the system occurs, so that no clear resonance increase can develop.

The invention claimed is:

1. A method for avoiding or reducing chatter vibrations in a drivetrain of a motor vehicle having an automated transmission with which two transmission stages are engageable simultaneously, the method comprising the steps of:
   driving in a first transmission stage;
   selecting a natural frequency of the drivetrain by engaging a second transmission stage to accelerate a transmission input shaft at an operating point, wherein the natural frequency is lower when the second transmission stage is engaged than when the second transmission stage is not engaged, and the natural frequency is lower when the first and second transmission stages are engaged than when only the first transmission stage is engaged.

2. The method of claim 1, further comprising the steps of:
   engaging the second transmission stage until a rotational speed of the drivetrain corresponding to the natural frequency has at least been met; and,
   disengaging the second transmission stage so that the natural frequency takes on a value which is greater than the natural frequency corresponding to a present speed of rotation.

3. The method of claim 2, further comprising the step of: accelerating the transmission input shaft through synchronization of the first transmission stage and the second transmission stage, the shaft being connected to the second transmission stage.

4. The method of claim 2, further comprising the step of: synchronizing the second transmission stage before the step of disengaging the second transmission stage.

5. The method of claim 1, wherein the first transmission stage is different than the second transmission stage.

6. The method of claim 1, wherein the first transmission stage is first gear, and the second transmission stage is second gear or a higher gear.

7. The method of claim 1, wherein the first transmission stage is second gear, and the second transmission stage is first gear or third gear or a higher gear.

8. A method for avoiding or reducing chatter vibrations in a drivetrain of a motor vehicle comprising:
   providing an automated transmission with two simultaneously engageable transmission stages;
   driving off in a first transmission stage;
   synchronizing a different transmission stage prior to reaching a rotational speed corresponding to a drivetrain natural frequency with the different transmission stage disengaged to change the drivetrain natural frequency.

9. The method of claim 8, wherein the drivetrain natural frequency is lower when the different transmission stage is engaged than when the different transmission stage is not engaged.

10. The method of claim 8 further comprising:
    disengaging the different transmission stage at a rotational speed greater than a rotational speed corresponding to the drivetrain natural frequency when the different transmission stage is not engaged.

11. The method of claim 8, wherein synchronizing the different transmission stage comprises accelerating a transmission shaft connected to the different transmission stage.

* * * * *